(12) United States Patent
Karafiath et al.

(10) Patent No.: US 9,180,933 B1
(45) Date of Patent: Nov. 10, 2015

(54) INTEGRATED STERN BULB AND FLAP

(71) Applicants: Gabor Karafiath, Silver Spring, MD (US); Chengwen Lin, North Potomac, MD (US); Steven Fisher, Bowie, MD (US); Dominic S. Cusanelli, Frederick, MD (US); Andrew J. Nowakowski, Reston, VA (US)

(72) Inventors: Gabor Karafiath, Silver Spring, MD (US); Chengwen Lin, North Potomac, MD (US); Steven Fisher, Bowie, MD (US); Dominic S. Cusanelli, Frederick, MD (US); Andrew J. Nowakowski, Reston, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/303,306

(22) Filed: Jun. 12, 2014

(51) Int. Cl.
| | |
|---|---|
| *B63B 1/22* | (2006.01) |
| *B63B 1/40* | (2006.01) |
| *B63B 39/06* | (2006.01) |
| *B63B 35/40* | (2006.01) |
| *B63B 21/66* | (2006.01) |
| *B63B 35/00* | (2006.01) |
| *B63G 8/00* | (2006.01) |

(52) U.S. Cl.
CPC . *B63B 1/40* (2013.01); *B63B 21/66* (2013.01); *B63B 35/00* (2013.01); *B63B 35/40* (2013.01); *B63B 39/061* (2013.01); *B63B 2035/006* (2013.01); *B63G 2008/002* (2013.01)

(58) Field of Classification Search
USPC ............................ 114/284–287, 61.28, 61.29
IPC .................................. B63B 39/061,1/22, 1/08
See application file for complete search history.

(56) References Cited

U.S. PATENT DOCUMENTS

| | | | | |
|---|---|---|---|---|
| 3,604,383 | A | * | 9/1971 | Ingelman-Sundberg ...... 114/287 |
| 3,808,998 | A | * | 5/1974 | Molotzak ....................... 114/284 |
| 4,000,712 | A | * | 1/1977 | Erikson et al. ............... 114/77 R |
| 4,550,673 | A | | 11/1985 | Ingvason |
| 5,280,761 | A | * | 1/1994 | Karafiath et al. ........... 114/61.28 |
| 6,038,995 | A | | 3/2000 | Karafiath et al. |
| 6,058,864 | A | | 5/2000 | Mannerfelt |
| 6,463,868 | B1 | | 10/2002 | Williams et al. |
| 6,571,724 | B1 | * | 6/2003 | Shen .............................. 114/284 |
| 6,698,370 | B1 | * | 3/2004 | Cusanelli ...................... 114/56.1 |
| 6,745,715 | B1 | | 6/2004 | Shen et al. |
| 2014/0137786 | A1 | * | 5/2014 | Gasper et al. ................. 114/285 |

OTHER PUBLICATIONS

Gabor Karafiath, Stern End Bulb for Energy Enhancement and Speed Improvement, International Conference on Fast Sea Transportation, Sep. 2011, USA.
Dominic Cusanelli & Gabor Karafiath, Hydrodynamic Energy Saving Enhancements for DDG 51 Class Ships, ASNE Day 2012, Feb. 9-10, 2012, USA.

\* cited by examiner

*Primary Examiner* — Stephen Avila
(74) *Attorney, Agent, or Firm* — Dave A. Ghatt

(57) ABSTRACT

The invention is directed to an integrated stern bulb and flap for a water vessel, more particularly, a bulb having a main body section and a forebody section, the bulb positioned between first and second flap portions. The integrated stern bulb and flap provides improved power efficiency by reducing resistance at high speeds. The bulb of the integrated stern bulb and flap may be hollow, the interior being stowage space adding to the payload of the water vessel.

14 Claims, 7 Drawing Sheets

INTEGRATED STERN BULB AND FLAP

STATEMENT OF GOVERNMENT INTEREST

The following description was made in the performance of official duties by employees of the Department of the Navy, and thus, the claimed invention may be manufactured, used, licensed by or for the United States Government for governmental purposes without the payment of any royalties thereon.

TECHNICAL FIELD

The following description relates generally to an integrated stern bulb and flap for a water vessel, in which the bulb has a main body section and a forebody section, the main body section attached to a flat transom at the stern of the water vessel, the bulb positioned between first and second flap portions, the integrated stern bulb and flap providing improved power efficiency by reducing resistance at high speeds. The bulb may hollow having stowage space within.

BACKGROUND

The USS Arleigh Burke (DDG 51) Class destroyer represents the latest in a distinguished lineage of combatants designed and developed by the U.S. Navy. It is one of the world's finest hull forms, optimizing speed, power, seakeeping, stability, and payload capacity, even though its initial design dates back nearly three decades. Since the first-of-class DDG 51 became operational in 1991, the hydrodynamic community has unveiled numerous advances in ship technology and design. The advances are applicable, not only to DDG 51 class ships, but also to other large hull ship forms, military and non-military.

The technological improvements were developed to enhance the operational performance and/or to foster reductions in operating and life cycle total ownership costs. The technological improvements include changes in propeller design, the addition of bow and stern end bulbs, and stem flaps, and improved rudder design. Cleaning techniques for cleaning the hull and propellers have also been developed to prevent increase in power and loss of propeller efficiency.

Stern flaps are extensions of the hull bottom surface created by a relatively small appendage welded to the transom of the ship. Stern flaps are known in the art, and have been proven during sea trials to reduce propulsive power, and to foster significant fuel cost savings, while increasing both ship endurance and top speed. The U.S. Navy has obtained several patents for stem flaps, such as, U.S. Pat. No. 6,038,995, U.S. Pat. No. 6,698,370 and U.S. Pat. No. 6,745,715. A stern flap based on U.S. Pat. No. 6,038,995, which could be retrofitted behind the transom wedge was successfully installed on all 28 Flight I and II hulls, DDG 51 through DDG 78.

Regarding the stern end bulbs, it is acknowledged that a ship moving in water generally creates a much larger bow wave than a stern wave. Thus, the most logical location for a bulb is at the bow because the large energy content in the bow wave is a potential source of more recoverable energy. Nevertheless, the stern end of the ship also generates waves that are a source of "wasted" energy. In contrast to the plethora of technical reports on bow bulb design and their universal and widespread usage at sea, there are only a few dozen technical reports and rare full scale applications of stern end bulbs. In order to be employed, it is desired that the stern end bulb design overcomes already enhanced performance with the existing stern flap.

Both stern flaps and stern end bulbs interact with the hull to produce a wave system that reduces the total wave resistance. In addition, the stern flap also reduces after-body resistance. For either body to be effective the drag reduction due to interactions with the hull resistance must be greater than the inherent drag of the device itself. The authors of this patent application have illustrated stern bulb/flap combinations conceptually in non-patent literature presentations, "Hydrodynamic Energy saving Enhancements for DDG 51 Class Ships" and "Stern End Bulb for Energy Enhancement and Speed Improvement". Apart from these conceptual illustrations, there is no prior art teaching of a stern end bulb and flap combination that is properly constructed to achieve the goals of reducing resistance on the hull, whilst avoiding the adverse effects of its structure.

In addition to improving the ship efficiencies as it relates to fuel consumption, it is also important to maintain efficiency while performing other mission related tasks. The USS Arleigh Burke (DDG 51) Class destroyer or other water vessels may perform other tasks related to monitoring the environment. This may involve the use of monitoring devices including, but not limited to, unmanned surface vehicles (USVs), unmanned underwater vehicles (UUVs), or towed arrays. The deploying of these sea-monitoring devices, and in the case of USVs and UUVs, the launching and recovering creates technical challenges that must be met. Some techniques for deployment may involve the use of davits or other lifting apparatuses for lifting the monitoring devices from the deck of the water vessel into the water below. Ramps may also be employed for lowering the monitoring devices into the water.

For more direct access to the water, some water vessels employ sea-level openings in their hulls through which the monitoring devices, such as USVs and UUVs may be passed. As stated above, the USS Arleigh Burke (DDG 51) Class destroyer has one of the world's finest hull forms, optimizing speed, power, seakeeping, stability, and payload capacity. Consequently, the addition of openings or penetrations to the hull structure may have adverse effects on vessel performance. Thus, it is desired to have a sea-level opening for launching and/or recovering monitoring devices that do not penetrate the hull or have adverse effects on vessel performance.

SUMMARY

In one aspect, the invention is a water vessel having improved power efficiency. The water vessel includes a hull having a bow and a stern. The stern has a flat transom that is bordered by a bottom edge, a top edge, a first side edge, and a second side edge. The hull has an undersurface defining the bottom surface of the hull. The water vessel also includes an integrated stern bulb and flap having, a first flap portion angled downwards at an angle $\alpha$, a second flap portion angled downwards at said angle $\alpha$, and a dual use bulb. In this aspect, the dual use bulb has a main body section, wherein the main body section is hollow and has a storage space within. The main body section is attached to the flat transom. The dual use bulb also has a forebody section, wherein the forebody section is attached to the undersurface of the hull, the bulb positioned between and connected to each of the first flap portion and the second flap portion. Each of the first flap portion and the second flap portion is positioned along the bottom edge of the flat transom. The main body section of the bulb comprises a top surface and a bottom surface, wherein the bottom surface is substantially U-shaped and extends substantially horizontally away from the stern in a rearward horizontal direction X, and the top surface is substantially flat and extends downwards at an angle β to the horizontal.

In another aspect, the invention is an at sea monitoring system having one or more monitoring devices. In this aspect, the system includes a water vessel having improved power efficiency. The water vessel has a hull with a bow, and a stern, wherein the stern comprises a flat transom. The flat transom is bordered by a bottom edge, a top edge, a first side edge, and a second side edge. The hull also has an undersurface defining the bottom surface of the hull. The water vessel has an integrated stern bulb and flap having a first flap portion angled downwards at an angle α, a second flap portion angled downwards at said angle α, and a dual use bulb. The dual use bulb has a main body section, wherein the main body section is hollow and has a storage space within for storing the one or more monitoring devices. The main body section is attached to the flat transom. The dual use bulb also has a forebody section, wherein the forebody section is attached to the undersurface of the hull. The bulb is positioned between and connected to each of the first flap portion and the second flap portion, wherein each of the first flap portion and the second flap portion is positioned along the bottom edge of the flat transom. The main body section of the bulb has a top surface and a bottom surface, wherein the bottom surface is substantially U-shaped and extends substantially horizontally away from the stern in a rearward horizontal direction X, and the top surface is substantially flat and extends downwards at an angle β to the horizontal.

BRIEF DESCRIPTION OF THE DRAWINGS

Other features will be apparent from the description, the drawings, and the claims.

DETAILED DESCRIPTION

Figure 1A:
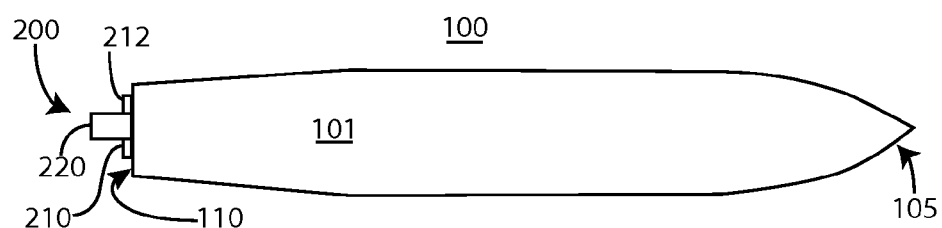
FIG. 1A is an exemplary top view of a water vessel having improved power efficiency, according to an embodiment of the invention.
Figure 1B:
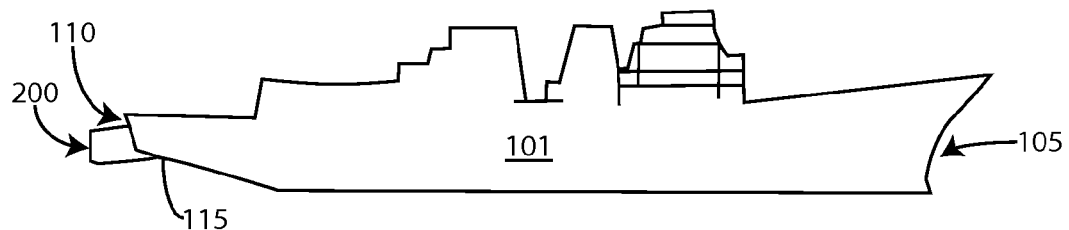
FIG. 1B is an exemplary side view of a water vessel having improved power efficiency, according to an embodiment of the invention.

FIG. 1A is an exemplary top view of a water vessel 100 having improved power efficiency, according to an embodiment of the invention. FIG. 1B is an exemplary side view of the water vessel 100 having improved power efficiency, according to an embodiment of the invention. FIGS. 1A and 1B show the water vessel 100 having a hull 101. The water vessel 100 may be a large water vessel such as a cargo vessel, a cruise vessel, a naval vessel or the like. According to an embodiment of the invention, the water vessel 100 is a USS Arleigh Burke (DDG 51) Class destroyer. FIGS. 1A and 1B show the hull 101 having a bow 105 and a stern 110. As shown in FIG. 1B, the stern 110 includes a flat transom 111, which as shown, may be raked upwards.

As shown in FIGS. 1A and 1B, and as outlined below, the water vessel 100 includes an integrated stern bulb and flap 200, which improves the power efficiency of the water vessel 100. The integrated stern bulb and flap 200 is attached to the flat transom 111 at the stern 110. As outlined below in greater detail, FIG. 1A shows the integrated stern bulb and flap 200 having a first flap portion 210 and a second flap portion 212. The integrated stern bulb and flap 200 also includes a dual use bulb 220.

Figure 2A:
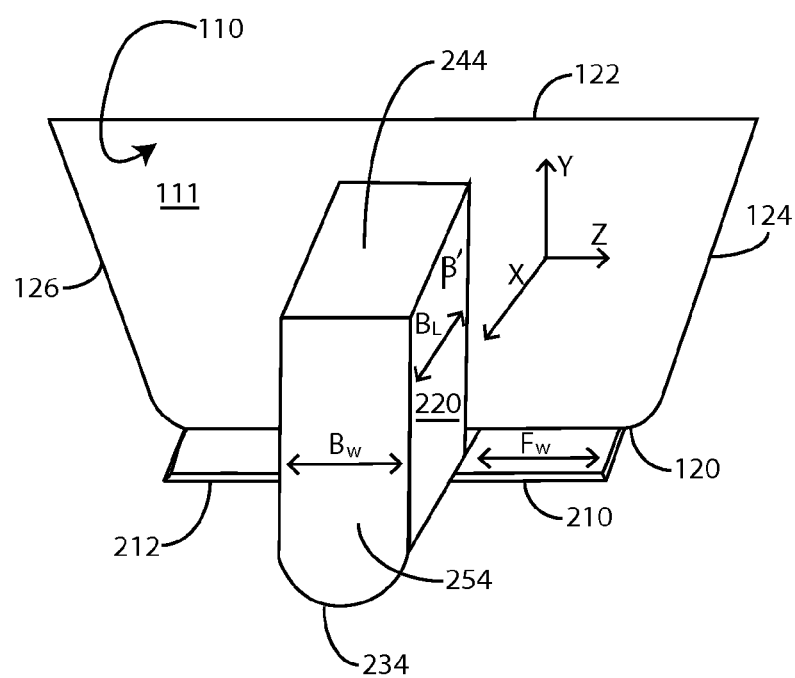
FIG. 2A is an exemplary perspective illustration of an integrated stern bulb and flap attached at the stern of the water vessel, according to an embodiment of the invention.

FIG. 2A is an exemplary perspective illustration of an integrated stern bulb and flap 200 attached at the stern 110 of the water vessel 100, according to an embodiment of the invention. As shown, the integrated stern bulb and flap 200 includes a first flap portion 210 and a second flap portion 212. The integrated stern bulb and flap 200 also includes a dual use bulb 220. The integrated stern bulb and flap 200 is attached at the flat transom 111 formed at the stern 110 of the hull 101. As shown, the flat transom 111 is bordered by a bottom edge 120, a top edge 122, a first side edge 124, and a second side edge 126.

As shown, the dual use bulb 220 is positioned centrally on the flat transom 111 between the first side edge 124 and the second side edge 126. The dual use bulb 220 is flanked on one side by the first flap portion 210 and on the other side by the second flap portion 212. As shown, the first flap portion 210 and the second flap portion 212 are both positioned along the bottom edge 120 of the flat transom 111.

Figure 2B:
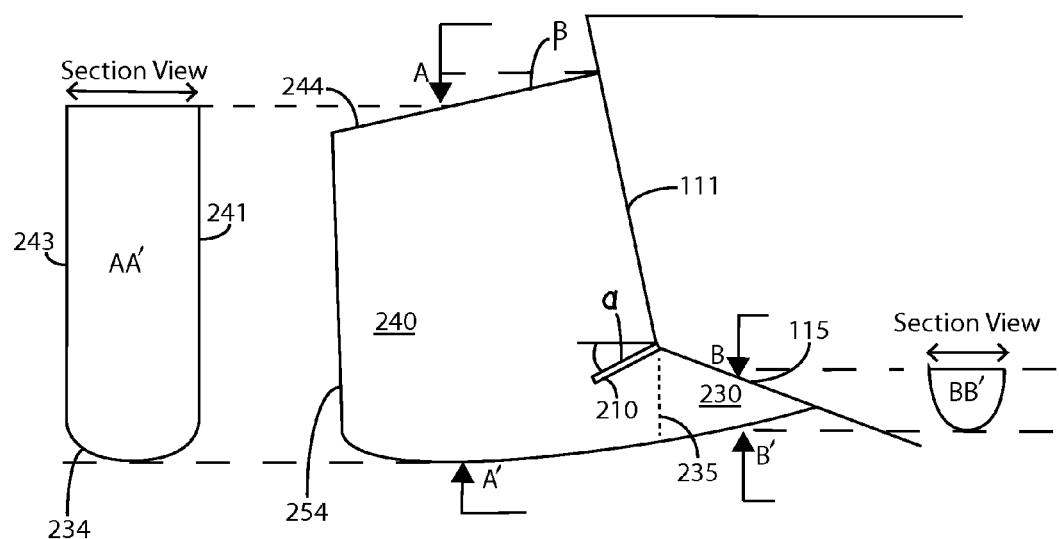
FIG. 2B is an exemplary side view of an integrated stern bulb and flap attached at the stern of the water vessel, according to an embodiment of the invention.

FIG. 2B is an exemplary side view of an integrated stern bulb and flap 200 attached at the stern 110 of the water vessel, according to an embodiment of the invention. The side view of FIG. 2B shows the side profile of the dual use bulb 220 having a forebody section 230 and a main body section 240. The sections 230 and 240 are separated by imaginary line 235. As shown, the forebody section 230 is attached to the hull 101 through contact with an underside 115 of the hull 101. The main body section 240 contacts the flat transom 111.

FIG. 2B also shows sectional view AA', through A-A', representing a slice through the main body section 240. The sectional view A-A' shows the main body section 240 having a section with a flat top edge 244, a substantially U-shaped bottom edge 234, and two vertically extending sides (241, 243). FIG. 2B also shows sectional view BB', through B-B', representing a slice through the forebody section 230. The sectional view BB' shows the forebody section 230 having a more rounded shape. FIG. 2B also shows one of the flap portions 210, which is angled downwards at an angle α. Although not shown in. FIG. 2B, the other flap portion 212 is also angled downwards at an angle α. According to an embodiment of the invention α is about 10° to about 15°. According to a preferred embodiment, α is 15°.

As outlined below, when the water vessel 100 is travelling at advanced speeds the forebody section 230 is the portion of the integrated stern bulb and flap 200 that makes initial contact with, and directs the downstream flow to the first and second flap portions 210 and 212 and to the main body section 240. The course of this flow improves the hydrodynamics of the water vessel 100 and provides energy savings. The forebody section view BB' as shown causes the initial redirecting of the do stream flow. This conical shape of the forebody 230 is shown in FIG. 2B. The forebody section 230 continues seamlessly into the lower portion of the main body section 240, which has a substantially U-shaped bottom surface 234 (as shown in FIGS. 2A and 2B). FIG. 2B also shows the main body section 240 having a top surface 244 is substantially flat and extends downwards at an angle β to the horizontal.

Returning to FIG. 2A, the shape and dimensions of the main body section 240 and the first and second flap portions (210, 212) are more clearly shown. FIG. 2A shows the substantially U-shaped bottom surface 234 as well as the flat top surface 244. FIG. 2A also shows a flat face 254 at a rearward end of the dual use bulb 220, the flat face extending substantially vertically from the bottom surface 234 to the top surface 244 of the bulb 220. As outlined below, according to an embodiment of the invention, the dual use bulb 220 may be hollow, i.e., both the forebody section 230 and the main body section 240. The hollow interior, particularly the main body section 240 may be used as stowage space. Also outlined below, according to an embodiment, the main body section 240 may include a lid (not shown) located on either the flat top surface 244 or the flat face 254 at the rearward end of the bulb 220, to provide access to the hollow interior.

FIG. 2A shows the main body section 240 of the bulb 220 having a bulb length $B_L$, measured in a rearward horizontal direction X, from the flat transom 111 to the flat face 254 at the rearward end of the bulb 220. The bulb 220 also has a bulb width $B_W$ depicting the width of the bulb 220. Because the bulb is sandwiched between the first and second flap portions (210, 212), the bulb width $B_W$ is essentially the distance that separates the first flap portion 210 from the second flap portion. FIG. 2A also shows the first and second flap portions (210, 212) each have a flap width $F_W$ in a direction parallel to the direction of the bulb width $B_W$. According to an embodiment of the invention, the ratio of the flap width $F_W$ to the bulb width $B_W$ is about 1:1. According to an embodiment of the invention, the water vessel 100 is a DDG 51 (lass destroyer, having a bulb length $B_L$ of about 24 ft., a bulb width $B_W$ of about 8 ft., and each of the first and second flap portions (210, 212) having flap widths $F_W$ of about 8 ft.

Figure 3A:
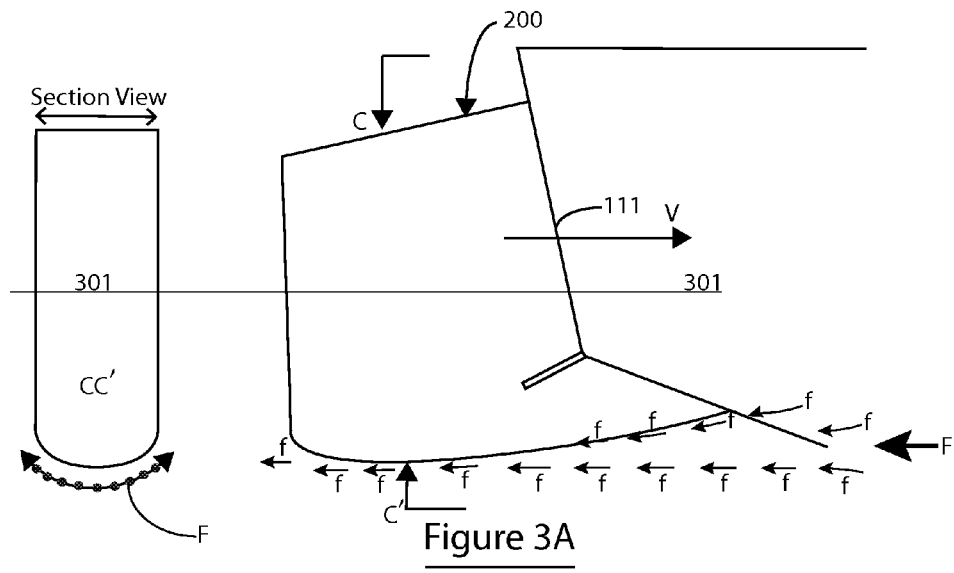
FIG. 3A is an exemplary explanatory illustration of the downstream flow at the stern of the water vessel having improved power efficiency, according to an embodiment of the invention.

As stated above, when the water vessel 100 is travelling at advanced speeds the forebody section 230 is the portion of the integrated stern bulb and flap 200 that makes initial contact with, and directs the downstream flow to the first and second flap portions 210 and 212 and to the main body section 240. The course of this flow improves the hydrodynamics of the water vessel 100 and provides energy savings. FIG. 3A is an exemplary explanatory illustration of the downstream flow at the stern 110 of the water vessel 100, and particularly the flow as directed by the integrated stern bulb and flap 200. According to the this embodiment, the water vessel 100 is a DDG 51, the bulb length $B_L$ is about 24 ft., the bulb width $B_W$ of about 8 ft. Each of the first and second flap portions (210, 212) have flap widths $F_W$ of about 8 ft, and are angled downwards at an α of about 15°.

In the explanatory illustration, the water vessel is travelling at a high velocity V as shown. According to the illustration, the velocity V may be about 16 knots to about 30 knots. As shown the flow F moves opposite to the velocity V. The F is made up of flow particles f, which is streamlined as shown. The particles f initially contact the forebody section 230 of the bulb 220. From the forebody section 230, the flow is directed to the main body section 240 of the bulb 220, and flows generally about the substantially U-shaped bottom surface 234. FIG. 3A also shows sectional view CC', through C-C', representing a slice through the main body section 240, showing the flow F at bout the substantially U-shaped bottom surface 234. The flow is maintained below the waterline 301, which coincides with the level at which the hull floats in open water. As shown, the waterline is about halfway up the main body section 240.

Figure 3B:
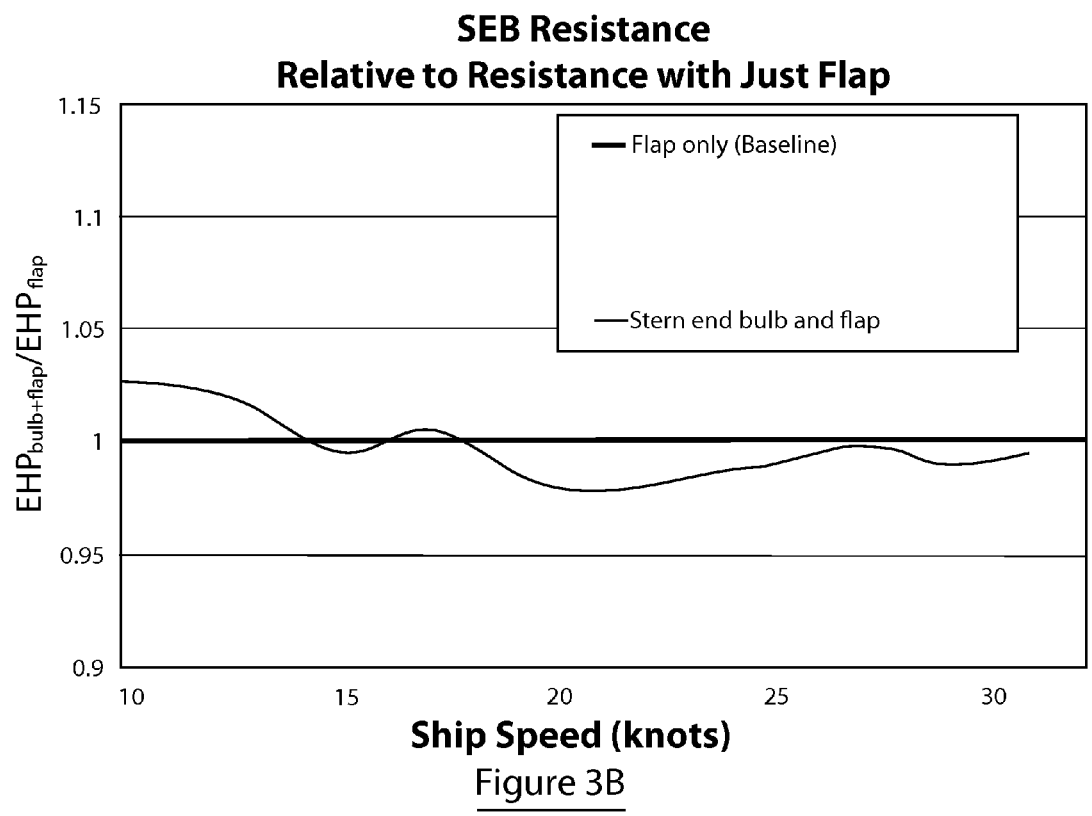
FIG. 3B is an exemplary graphical illustration of the effective power usage using the combination stern end bulb and flap, as compared to using a flap-only arrangement.

FIG. 3B is an exemplary graphical illustration of the effective power usage using the combination stern end bulb and flap 200, as compared to using a flap only. One of the goals of the instant invention, i.e., the integrated stern end bulb and flap 200, is to improve efficiency of water vessels, as compared to water vessels that use only a stern end flap. The FIG. 3B evaluations and comparisons were made on the merits of annual power (effective or delivered horsepower-hours) or annual fuel consumption (barrels/year) derived by methods implemented by the Naval Surface Warfare Center, Carderock Division. The water vessel fuel consumption calculation is based on four prescribed vessel specific averaged input constraints: (1) Class speed-time profile (STP); (2) Engine alignment profile at each speed; and, (3) Annual underway hours and (4) Annual underway fuel consumption for propulsion. The calculation then uses three prescribed input equations defining propulsion engine fuel rates (gallons/hr) versus delivered power, one equation for each of the three engine alignments (single, split-plant, full-plant). The variable in the calculation is the delivered power versus speed relationship, which is predicted at each speed in the speed-time profile from the model-scale experiments. Predicted delivered power is used to determine fuel rates at each designated speed, which is multiplied by the annual hours at that speed weighted by the reported engine alignment profile. The summation of the three fuel rates, first at each speed, and then by all speeds of the STP, determines the annual fuel consumption for propulsion. This method determines the annual fuel used by the propulsion engines, during underway hours.

The graph of FIG. 3B shows the Effective Horsepower (EHP) for flap line 1, which is representative of a water vessel using only a stern end flap. FIG. 3B also shows the EHP for the integrated stern end bulb and flap. As shown, there is significant power savings for the integrated stern end bulb and flap, as compared to using the flap only, when the water vessel travels from about 16 knots to about 30 knots.

Figure 4A:
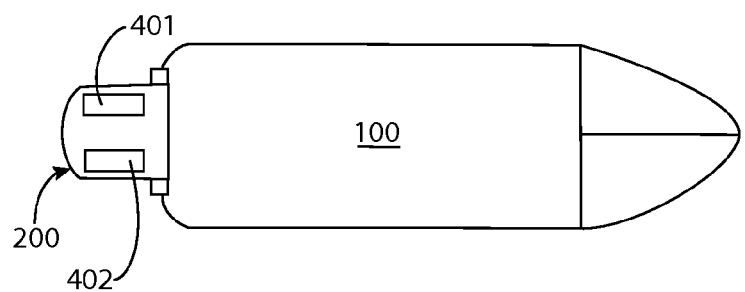
FIG. 4A is a schematic illustration of an at sea monitoring system, according to an embodiment of the invention.

In addition to improving the ship efficiencies as it relates to power consumption, it is also important to maintain efficiency while performing other mission related tasks. Water vessels may be employed to perform tasks related to monitoring the environment, in the process utilizing one or more monitoring devices. These one or more monitoring devices may include for example, unmanned vehicles such as USVs and UUVs, or towed arrays. There are efficiencies related to the deployment of these monitoring devices. For example in the case of USVs, the recovery of a smaller vessel is accomplished by driving the smaller vessel alongside a stationary parent ship and lifting the smaller vessel by davit into the parent ship. Alternatively, the USV may be driven up a ramp into the water vessel. Openings in the hull which create hydrodynamic inefficiencies may also be used to deploy smaller vessels. FIG. 4A is a schematic illustration of an at sea monitoring system that improves efficiencies related to the deployment or recovery of monitoring devices, avoiding the pitfalls outlined above.

As shown, FIG. 4A schematically illustrates an at sea monitoring system, including the improved power efficiency water vessel 100, as well as one or more monitoring devices (401, 402). As outlined above, the water vessel includes an integrated stern end bulb and flap 200 which is responsible for improving the efficiency of the water vessel. The bulb 220 of the integrated stern end bulb and flap 200 has a hollow interior, which may be used for storing and deploying the one or more monitoring devices (401, 402), improving the efficiency of monitoring operations, and also improving the payload of the water vessel 100. As stated above, the main body section 240 of the bulb 220 may include a lid 245 located on either the flat top surface 244 or the flat face 254 at the rearward end of the bulb 220, to provide access to the hollow interior, allowing the deployment and recovery of the one or more monitoring devices (401, 402). With this arrangement, there is no need to launch or recover the one or more monitoring devices (401, 402) from the main deck of the water vessel 100.

Figure 4B:
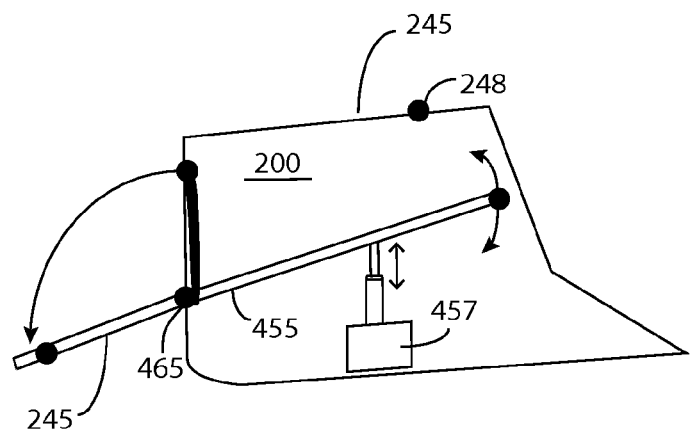
FIG. 4B is an exemplary side view of a dual use bulb having one or more monitoring devices stored within, according to an embodiment of the invention.

FIG. 4B is an exemplary side view of a dual use bulb 220 having one or more monitoring devices 401 stored within, according to an embodiment of the invention. According to this embodiment, the one or more monitoring devices 401 may be unmanned vehicles such as USVs and UUVs, for monitoring the environment at the surface or below the surface of the water. According to this embodiment, the bulb 220 includes a platform 455 for supporting, receiving, and deploying the unmanned vehicle 401. As shown, the platform 455 may slope downwards to facilitate launching and recovery. Preferably, the platform 455 is mounted at or above the waterline 301. According to an embodiment of the invention, the platform 455 may be pivotally attached at one end 456. An actuator 457 is connected to the platform 455, and may be activated (remotely or otherwise) to adjust the downward slope of the platform 455 enhancing the launching and recovery operations.

As outlined, the bulb may include a lid 245 on either the flat top surface 244 or the flat face 254. Surfaces 244 and 254 are preferred because generally these surfaces do not affect the hydrodynamic flow of the water vessel 100. A lid 245 may be employed at the flat top surface 244 if the one or more monitoring devices are merely stored in the within bulb 220. According to this embodiment, the lid may be hinged at a higher end of the sloped surface at 248, so that the closing of the lid 245 is gravity assisted. For launching and recovery operations, it is preferred to position the lid 245 at the surface 254 at the rear. As shown, according to this embodiment, the lid 254 may be hinged at the bottom end of the platform 455, so that the lid 245 opens downwards and acts as an extension of the platform, facilitating launching and recovery operations.

Figure 4C:
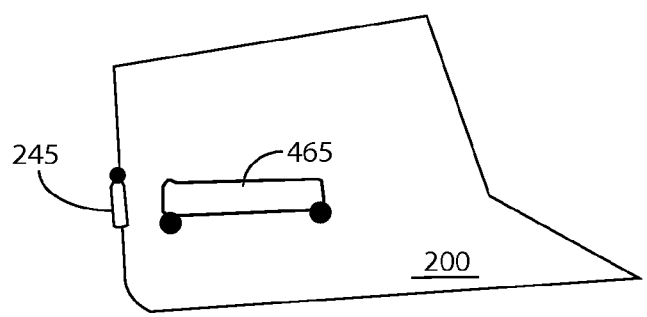
FIG. 4C is an exemplary side view of a dual use bulb having one or more monitoring devices stored within, according to an embodiment of the invention.

FIG. 4C is an exemplary side view of a dual use bulb 220 having one or more monitoring devices 402 stored within, according to an embodiment of the invention. According to this embodiment, the one or more monitoring devices 402 may be multi-line towed arrays, for monitoring the environment at the surface or below the surface of the water. According to this embodiment, the bulb 220 includes a spool arrangement 465 to dispense or retrieve the towed arrays through the lid 245, which according to this embodiment is preferably positioned at the rear surface 254, with the spool arrangement 465 mounted close enough to the lid 245 to have direct access to the opening for the deployment and retrieval of the towed arrays. Alternatively, the lid 245 may be mounted at the top surface 244. The spool arrangement 465, may be any known device for deploying and retrieving multi-line towed arrays. For example, the spool arrangement 465 may be a tether retraction device having a series of spools driven by a constant tension spring system, as outlined in U.S. Pat. No. 6,463,868, incorporated herein by reference.

Figure 5:
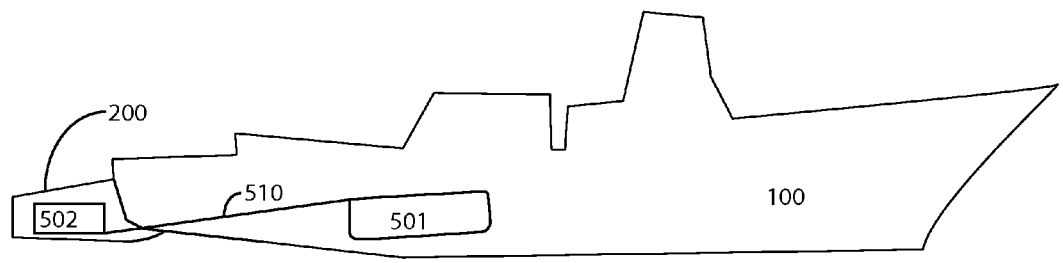
FIG. 5 is a schematic illustration of a water vessel having improved power efficiency, having an auxiliary fuel supply, according to an embodiment of the invention.

FIG. 5 is a schematic illustration of a water vessel 100 having improved power efficiency, having an auxiliary fuel supply, according to an embodiment of the invention. FIG. 5 shows the water vessel 100 having a main fuel supply 501. The water vessel 100 also includes an auxiliary fuel supply 502 located within the hollow interior of the dual use bulb 220. FIG. 5 also shows a conduit 510 connecting the auxiliary fuel supply tank 502 to the main fuel supply tank 501. Alternatively, the auxiliary fuel tank 502 may be directly connected to the propulsion arrangement. Although not illustrated, known pumps and valves may be employed to pump the fuel through the conduits 510. The bulb may include a lid 245 on either the flat top surface 244 or the flat face 254 to provide direct access to the auxiliary fuel tank 502.

Figure 6:
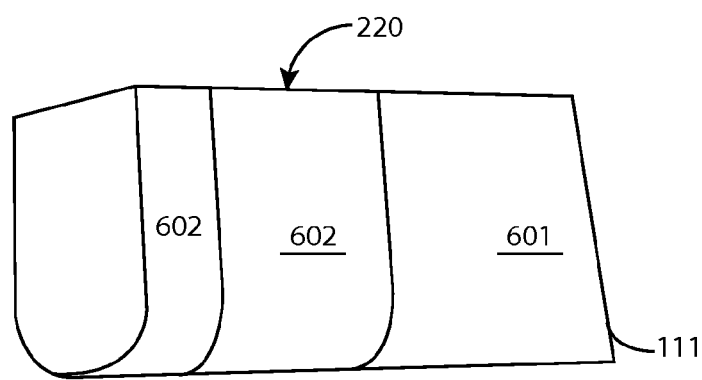
FIG. 6 is a schematic illustration of a dual use bulb having a plurality of segments, according to an embodiment of the invention.

FIG. 6 is a schematic illustration of a dual use bulb 220 having a plurality of segments, according to an embodiment of the invention. The segments may be substituted for the main body section 240 of the dual use bulb 220, outlined above. As shown, the bulb has a primary wherein the main body section of the dual use bulb comprises a plurality of segments, comprising a primary bulb segment 601 fixed to the flat transom 111 of the stern 110. FIG. 6 also shows a plurality of secondary bulb segments 602 having different segment lengths $S_L$, each of the plurality of secondary bulb segments attachable to the primary bulb segment 601. The secondary bulb segments are also attachable to each other. One or more of the secondary bulb segments 602 may be selected and attached, based on desired hydrodynamic requirements, depending on the type of water vessel 100 and/or existing environmental conditions. According to this embodiment, the primary bulb segment and the secondary bulb segments may all be hollow, having stowage spaces within. Known connectors and attachment devices may be used to attach the segments (601, 602)

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A water vessel having improved power efficiency comprising:
 a hull having:
  a bow; and
  a stern, wherein the stern comprises a flat transom, wherein the flat transom is bordered by a bottom edge, a top edge, a first side edge, and a second side edge; and
  an undersurface defining the bottom surface of the hull;
 an integrated stern bulb and flap comprising:
  a first flap portion angled downwards at an angle α;
  a second flap portion angled downwards at said angle α; and
  a dual use bulb comprising;
   a main body section, wherein the main body section is hollow and has a storage space within, the main body section attached to the flat transom; and
   a forebody section, wherein the forebody section is attached to the undersurface of the hull, the bulb positioned between and connected to each of the first flap portion and the second flap portion, wherein each of the first flap portion and the second flap portion is positioned along the bottom edge of the flat transom, and wherein the main body section of the bulb comprises a top surface and a bottom surface, wherein the bottom surface is substantially U-shaped and extends substantially horizontally away from the stern in a rearward horizontal direction X, and the top surface is substantially flat and extends downwards at an angle β to the horizontal.

2. The water vessel of claim 1, wherein the main body section of the bulb has a flat face at a rearward end of the bulb, the flat face extending substantially vertically from the bottom surface of the bulb to the top surface of the bulb, wherein the main body section of the bulb has a bulb length $B_L$, measured in said rearward horizontal direction X, from the flat transom to the flat face at the rearward end of the bulb, and wherein the bulb has a bulb width $B_W$, and the first and second flap portions each have a flap width $F_W$ in a direction parallel to the direction of the bulb width $B_W$, and wherein the ratio of the flap width $F_W$ to the bulb width $B_W$ is about 1:1.

3. The water vessel of claim 1, wherein the first and second stern flaps are angled downwards at an angle α of about 15 degrees, and wherein the ratio of the bulb length $B_L$ to the $B_W$ is about 3:1, wherein the water vessel further comprises a waterline that coincides with the level at which the hull floats in open water, the waterline extending along the hull and at a height of about half-way up the bulb between the flat top surface and the substantially U-shaped bottom surface of the bulb, and wherein the bulb has an initial flow receiving area at said forebody section for receiving the flow of water when the water vessel has a ship speed of about 16 knots to about 30 knots, which directs the flow to main body section, the flow of water additionally guided by the first and second flap portions, wherein the flow traverses the main body section of the bulb at a height substantially below the waterline, the flow thereby providing an effective power reduction when the water vessel has said ship speed of about 16 knots to about 30 knots.

4. The water vessel of claim 3, wherein the main body section of the dual use bulb comprises a lid for gaining access to the storage space within, the lid located on one of the top surface of the bulb or the flat face at the rearward end of the bulb, wherein the lid is hinged to pivot between an open position and a closed position, wherein in the open position the lid allows for the launching and recovery of the one or more monitoring devices.

5. The water vessel of claim 4, wherein the bulb further comprises a spool arrangement in the storage space within the main body section, the spool arrangement having multi-line towed arrays mounted thereon, wherein the spool arrangement dispenses and retrieves the multi-line towed arrays through the lid on the main body of the bulb.

6. The water vessel of claim 4, wherein the bulb further comprises a platform in the storage space within the main body section, for supporting, launching and recovering one or more unmanned water vessels.

7. The water vessel of claim 3, wherein the bulb further comprises an auxiliary fuel tank mounted in the storage space within the main body section, and a conduit attached to the fuel tank for feeding fuel from the bulb to a main fuel tank within the hull of the water vessel.

8. The water vessel of claim 3, wherein the main body section of the dual use bulb comprises a plurality of segments, comprising a primary bulb segment fixed to the flat transom of the stern, and a plurality of secondary bulb segments having different segment lengths, each of the plurality of secondary bulb segments attachable to the primary bulb segment.

9. An at sea monitoring system comprising:
one or more monitoring devices;
a water vessel having improved power efficiency comprising;
a hull having,
a bow, and
a stem, wherein the stern comprises a flat transom, wherein the flat transom is bordered by a bottom edge, a top edge, a first side edge, and a second side edge, and
an undersurface defining the bottom surface of the hull,
an integrated stern bulb and flap comprising;
a first flap portion angled downwards at an angle α,
a second flap portion angled downwards at said angle α, and
a dual use bulb comprising,
a main body section, wherein the main body section is hollow and has a storage space within for storing the one or more monitoring devices, the main body section attached to the flat transom, and
a forebody section, wherein the forebody section is attached to the undersurface of the hull, the bulb positioned between and connected to each of the first flap portion and the second flap portion, wherein each of the first flap portion and the second flap portion is positioned along the bottom edge of the flat transom, and wherein the main body section of the bulb comprises a top surface and a bottom surface, wherein the bottom surface is substantially U-shaped and extends substantially horizontally away from the stern in a rearward horizontal direction X, and the top surface is substantially flat and extends downwards at an angle β to the horizontal.

10. The at sea monitoring system of claim 9, wherein the main body section of the dual use bulb comprises a lid for gaining access to the storage space within, wherein the lid is hinged to pivot between an open position and a closed position, wherein in the open position the lid allows for the launching and recovering of the one or more monitoring devices.

11. The at sea monitoring system of claim 10, wherein the main body section of the bulb has a flat face at a rearward end of the bulb, the flat face extending substantially vertically from the bottom surface of the bulb to the top surface of the bulb, wherein the main body section of the bulb has a bulb length $B_L$, measured in said rearward horizontal direction X, from the flat transom to the flat face at the rearward end of the bulb, and wherein the bulb has a bulb width $B_W$, and the first and second flap portions each have a flap width $F_W$ in a direction parallel to the direction of the bulb width $B_W$, and wherein the ratio of the flap width $F_W$ to the bulb width $B_W$ is about 1:1.

12. The at sea monitoring system of claim 11, wherein the first and second stern flaps are angled downwards at an angle α of about 15 degrees, and wherein the ration of the bulb length $B_L$ to the $B_W$ is about 3:1, wherein the water vessel further comprises a waterline that coincides with the level at which the hull floats in open water, the waterline extending along the hull and at a height of about half-way up the bulb between the flat top surface and the substantially U-shaped bottom surface of the bulb, and wherein the bulb has an initial flow receiving area at said forebody section for receiving the flow of water when the water vessel has a ship speed of about 16 knots to about 30 knots, which directs the flow to main body section, the flow of water additionally guided by the first and second flap portions, wherein the flow traverses the main body section of the bulb at a height substantially below the waterline region, the flow thereby providing an effective power reduction when the water vessel has said ship speed of about 16 knots to about 30 knots.

13. The at sea monitoring system of claim 12, wherein the one or more monitoring devices comprises multi-line towed arrays, and wherein the bulb further comprises a spool assembly in the storage space within the main body section, the spool assembly supporting the multi-line towed arrays thereon, wherein the spool arrangement dispenses and retrieves the multi-line towed array through the lid on the main body of the bulb.

14. The at sea monitoring system of claim 12, wherein the one or more monitoring devices comprises one or more unmanned water vessels, and wherein the bulb further comprises a platform in the storage space within the main body section for supporting, launching, and recovering the one or more unmanned water vessels.

\* \* \* \* \*